(12) United States Patent
Baer et al.

(10) Patent No.: US 6,782,266 B2
(45) Date of Patent: Aug. 24, 2004

(54) METHOD OF WIRELESS COMMUNICATION IN RESTRICTED WIRELESS ZONES

(75) Inventors: Wayne G. Baer, Barrington, IL (US); Daniel S. Rokusek, Long Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 581 days.

(21) Appl. No.: 09/944,977

(22) Filed: Aug. 31, 2001

(65) Prior Publication Data

US 2003/0045322 A1 Mar. 6, 2003

(51) Int. Cl.[7] .............................................. H04Q 7/20
(52) U.S. Cl. ................. 455/456.4; 455/421; 455/553.1; 455/465
(58) Field of Search ........................... 455/404.2, 414.1, 455/415, 419, 421, 422.1, 432.1, 552.1, 553.1, 426.1, 462, 465, 456.4, 435.2

(56) References Cited

U.S. PATENT DOCUMENTS

| | | | | |
|---|---|---|---|---|
| 5,911,120 A | * | 6/1999 | Jarett et al. ................. | 455/417 |
| 6,201,973 B1 | * | 3/2001 | Kowaguchi ............... | 455/456.6 |
| 6,560,443 B1 | * | 5/2003 | Vaisanen et al. ......... | 455/553.1 |
| 6,625,455 B1 | * | 9/2003 | Ariga ......................... | 455/565 |
| 6,731,957 B1 | * | 5/2004 | Shamoto et al. ......... | 455/552.1 |

* cited by examiner

Primary Examiner—Nick Corsaro
Assistant Examiner—John J Lee
(74) Attorney, Agent, or Firm—Kevin D. Wills (57) ABSTRACT

A method of wireless communication in restricted wireless zones (102) includes providing a restricted wireless zone communication system (104) having one or more wireless nodes (106) and a wireless device (110) having a first transceiver (150) restricted from operating in a restricted wireless zone (102) and a second transceiver (152) not restricted from operating in a restricted wireless zone (102). Upon entering restricted wireless zone (102) first transceiver (150) is disabled and second transceiver (152) is enabled to communicate with restricted wireless zone communication system (104). Wireless device (110) is then able to send and receive content from outside restricted wireless zone (102). Upon wireless device (110) leaving restricted wireless zone (102), the second transceiver is disabled and the first transceiver (150) is enabled.

27 Claims, 4 Drawing Sheets

METHOD OF WIRELESS COMMUNICATION IN RESTRICTED WIRELESS ZONES

FIELD OF THE INVENTION

This invention relates generally to communication and, more particularly a method of wireless communication.

BACKGROUND OF THE INVENTION

Currently, users of wireless communication devices such as cell phones, laptops, personal digital assistants, and the like, must shut these devices off or restrict their use in certain environments. These environments can include hospitals, remote locations, radio frequency sensitive locations such as aircraft, or any other location that radio frequency transmissions might be disruptive to persons or equipment in the vicinity.

In other environments, use of wireless communication devices might be difficult or impossible due to distance of travel over a given amount of time, and the like. In these environments, wireless service providers for a given wireless communication device can be out of range of the wireless communication devices making service difficult or impossible, and in effect, rendering these devices useless for the duration of a given journey or while in an isolated location. In many situations this has the effect of frustrating users of these devices and rendering users less productive than would otherwise be possible. Even when use of wireless communication devices is permitted in these instances, the devices are often limited to send only mode, or wireless service providers are unable to track and bill users of devices in these restricted environments.

Accordingly, there is a significant need for methods allowing wireless communication devices to function in remote locations, over long-distance journeys and in radio frequency sensitive locations.

There is also a significant need for methods of allowing wireless communication device users to be tracked and billed for device use in a restricted environment or location.

Accordingly, there is a significant need for methods of wireless communication in a restricted wireless zones that overcome the deficiencies of the prior art outlined above.

BRIEF DESCRIPTION OF THE DRAWINGS

Referring to the drawing.

It will be appreciated that for simplicity and clarity of illustration, elements shown in the drawing have not necessarily been drawn to scale. For example, the dimensions of some of the elements are exaggerated relative to each other. Further, where considered appropriate, reference numerals have been repeated among the Figures to indicate corresponding elements.

DESCRIPTION OF THE PREFERRED EMBODIMENTS

The present invention is a method of wireless communication in restricted wireless zones with software components running on mobile client platforms and on remote server platforms. To provide an example of one context in which the present invention may be used, an example of a method wireless communication in restricted wireless zones will now be described. The present invention is not limited to implementation by any particular set of elements, and the description herein is merely representational of one embodiment. The specifics of one or more embodiments of the invention are provided below in sufficient detail to enable one of ordinary skill in the art to understand and practice the present invention.

Figure 1:
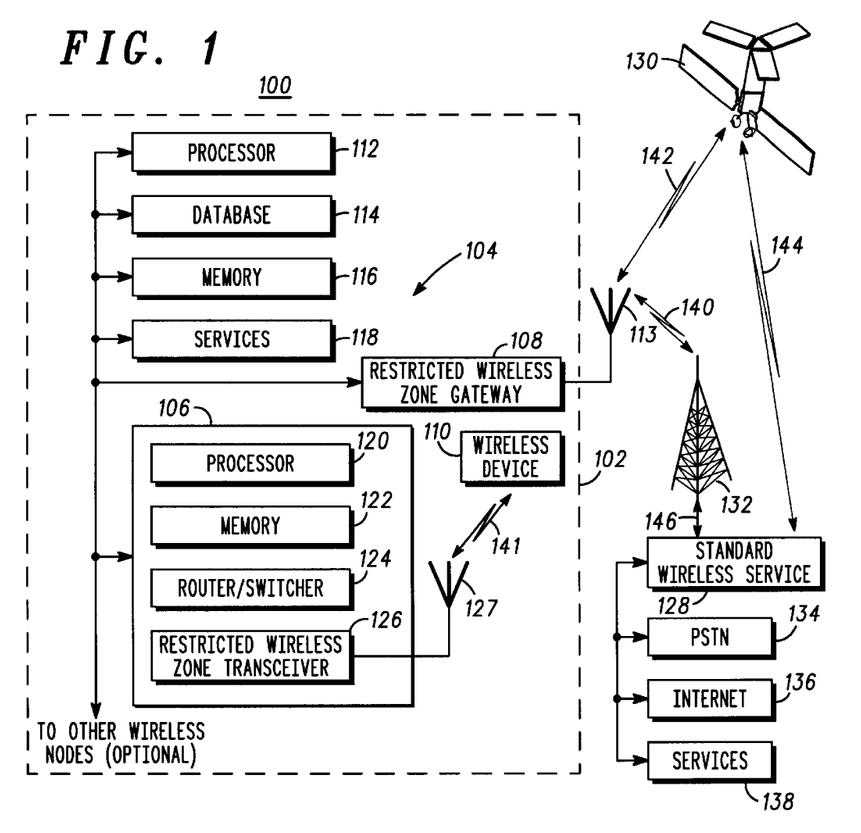
FIG. 1 depicts an exemplary communication system, according to one embodiment of the invention.

FIG. 1 depicts an exemplary communication system 100, according to one embodiment of the invention. Shown in FIG. 1 are examples of components of a communications system 100, which comprises among other things, a restricted wireless zone 102 and a wireless device 110. Restricted wireless zone (RWZ) 102 can be a location or area where the use of wireless devices 110 are restricted or prohibited either occasionally or on a constant basis. Examples of such locations can include, without limitation, hospitals, remote locations or other locations where standard cellular or radio frequency (RF) signals can be disruptive or harmful to surrounding persons or equipment. Other examples include inside aircraft, particularly during take-offs and landings, boats, trains, and the like. In addition, a restricted wireless zone 102 can occur where standard RF signals are unable to reach wireless devices 110, such as in aircraft or boats traveling great distances and/or through or over remote locations.

In an embodiment of the invention, restricted wireless zone 102 can include a restricted wireless zone communication system 104 comprising, without limitation, a restricted wireless zone gateway 108 coupled to one or more wireless nodes 106. Restricted wireless zone gateway 108 can comprise network access devices (NAD's) known to those skilled in the art, for example, a phonebank or other wireless communication means that utilizes narrowband and/or broadband connections with standard cellular network protocols such as Global System for Mobile Communications (GSM), Time Division Multiple Access (TDMA), Code Division Multiple Access (CDMA), and the like, and also standard transmission control protocol/internet protocol (TCP/IP) equipment. RWZ gateway 108 can also send and receive content using with standard paging networks, FM sub-carriers, satellite networks, and the like.

Without limitation, restricted wireless zone communication system 104 can be contained within, and optionally form an integral part of a vehicle, such as a car, truck, bus, train, aircraft, or boat, or any type of structure, such as a house, office, school, commercial establishment, and the like.

Restricted wireless zone communication system 104 can be coupled to and communicate with other communications networks, via antenna 113, including one or more standard wireless services 128, the Internet 136, a public switched telecommunication network (PSTN) 134, local area network (LAN), wide area network (WAN), satellites 130, services 138, and the like. Restricted wireless zone communication system 104 can be coupled to a standard wireless service 128 utilizing wireless communication link 140 via a local node 132, such as a cellular tower or other communication node, which is in turn coupled to standard wireless service 128 via wireline or wireless communication link 146. RWZ communication system 104 can also be coupled to satellite 130 via wireless communication link 142. Satellite 130 is then coupled to standard wireless service 128 via wireless communication link 144.

Standard wireless service can be any wireless service provider such as a cellular service, paging service, Internet service provider (ISP), and the like. Any service, hardware, software, infrastructure, and the like that provides wireless service to wireless device 110 and access to other communication networks such as PSTN 134, Internet, 136, or other services 138 can be considered a standard wireless service 128.

Restricted wireless zone communication system 104 can include any number of wireless nodes 106. Each wireless node comprises a processor 120 having algorithms stored in memory 122. Memory 122 comprises control algorithms, and can include, but is not limited to, random access memory (RAM), read only memory (ROM), flash memory, electrically erasable programmable ROM (EEPROM), and the like. Memory 122 can contain stored instructions, tables, data, and the like, to be utilized by processor 120. Wireless node 106 also comprises a standard router/switcher 124 and a restricted wireless zone transceiver 126. RWZ transceiver 126 is designed to function solely in restricted wireless zone 102 and to communicate with one or more wireless devices 110 via antenna 127. An example of RWZ transceiver 126 is a Bluetooth™ compatible transceiver. Bluetooth™ is a short-range wireless standard capable of forming personal wireless networks utilizing mobile, portable, wireless devices 110. The invention is not limited to a Bluetooth™ compatible transceiver and can include any short-range wireless transceivers and protocols. Any number of wireless nodes 106 can be deployed in restricted wireless zone 102 in order to provide coverage for a portion or the entire zone.

Coupled to RWZ gateway 108 and wireless node 106 can be a processor 112 and memory 116. Memory 116 comprises control algorithms, and can include, but is not limited to, random access memory (RAM), read only memory (ROM), flash memory, electrically erasable programmable ROM (EEPROM), and other memory such as a hard disk, floppy disk, and/or other appropriate type of memory, and the like. Memory 116 can contain stored instructions, tables, data, and the like, to be utilized by processor 112. Memory 116 contains and runs an operating system and applications to control and communicate with onboard peripherals. RWZ communication system 104 can initiate and perform communications with other communication networks such as PSTN 134, the Internet 136, and the like, in accordance with suitable computer programs, such as control algorithms stored in memory.

Optionally, RWZ communication system can also include one or more databases 114 and services 118. Databases 114 can be used to store information pertaining to RWZ communication system 104 users, for example, personal profiles, Bluetooth™ profiles, usage history, preferences, and the like. Services 118 can be offered to users of RWZ communication system 104 via wireless device 110.

Services 118 can be located within RWZ communication system 104, distributed between RWZ communication system 104 and outside of RWZ communication system 104, for example services 138, and the like. A service can be an encapsulation of some functionality that is of use to one or more service-using entities (current or anticipated) or that needs to be isolated from the service-using entity for some reason. A service can provide access to information or perform some computation. Services 118 also provide a desired functionality of a human user. Local services, such as those at RWZ communication system 104, can provide access to functionality that is local to the platform, such as an on-board global positioning system (GPS) device, games, email, and the like. Remote services, such as those outside of RWZ communication system 104, can be offered by an external server, via a standard wireless service 128, and the like. All services whether internal to RWZ communication system 104 or external thereto have similar functionality and are hereinafter referred to as services 118, 138.

Figure 2:
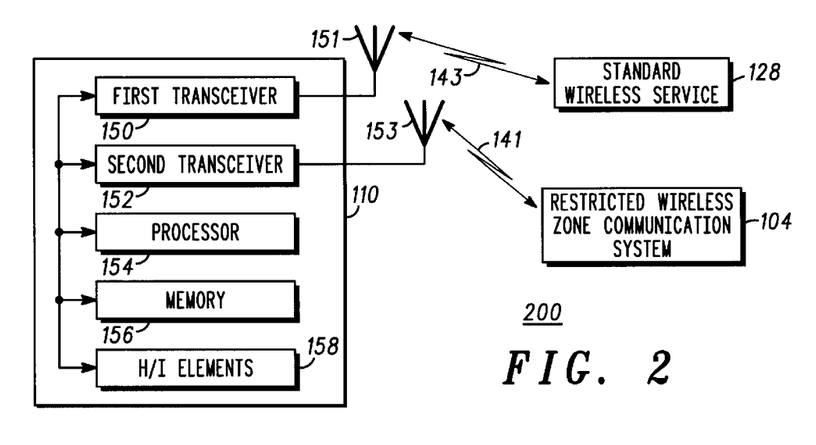
FIG. 2 illustrates a simplified block diagram of a wireless device, according to one embodiment of the invention.

FIG. 2 illustrates a simplified block diagram 200 of a wireless device 110, according to one embodiment of the invention. Wireless device 110 without limitation can include a wireless unit such as a cellular or Personal Communication Service (PCS) telephone, a pager, a hand-held computing device such as a personal digital assistant (PDA) or Web appliance, a personal computer, or any other type of wireless communications and/or computing device.

As shown in FIG. 2, wireless device 110 includes a first transceiver 150 coupled to antenna 151 and disposed to send and receive content via wireless communication link 143, and a second transceiver 152 having an antenna 153 disposed to send and receive content via wireless communication link 141. Content can include any type of data, for example, audio, video, text, text-to-speech, and the like.

First transceiver 150 is designed primarily to communicate with standard wireless service 128 via wireless communications link 143, and can be, for example, a standard cellular wireless transceiver designed to function with standard cellular network protocols such as GSM, TDMA, CDMA, and the like. Also included in the scope of the invention, is a first transceiver that supports standard TCP/IP equipment. In an embodiment of the invention, first transceiver 150 is designed to communicate with standard wireless service 128 and is restricted from operating in restricted wireless zone 102. First transceiver 150 can be restricted from operating in restricted wireless zone 102, for example, because restricted wireless zone 102 contains radio frequency sensitive equipment that is subject to disruption by first transceiver 150. In one embodiment, restricted wireless zone 102 is within an aircraft where first transceiver 150 is capable of disrupting radio navigation and other RF sensitive equipment aboard the aircraft.

Second transceiver 152 is designed primarily to communicate with RWZ communication system 104 via wireless communication link 141, and can be, for example, a Bluetooth™ transceiver. The invention is not limited to a Bluetooth™ compatible transceiver and covers any other short-range wireless transceivers and protocols. In an embodiment of the invention, second transceiver 152 is not restricted from operating in restricted wireless zone 102.

Coupled to first transceiver 150 and second transceiver 152 are processor 154, memory 156 and human interface elements 158. Memory 156 comprises control algorithms, and can include, but is not limited to, random access memory (RAM), read only memory (ROM), flash memory, electrically erasable programmable ROM (EEPROM), and the like. Memory 156 can contain stored instructions, tables, data, and the like, to be utilized by processor 154.

Human interface (H/I) elements 158 comprise elements such as a display, a multi-position controller, one or more control knobs, one or more indicators such as bulbs or light emitting diodes (LEDs), one or more control buttons, one or more speakers, a microphone, and any other H/I elements required by wireless device. H/I elements 158 are coupled to first transceiver 150 and second transceiver 152 and can request and display content and data including, application data, position data, personal data, email, audio/video, and the like, from services 118, 138 and applications both within and outside of RWZ 102. The invention is not limited by the (H/I) elements described above. As those skilled in the art will appreciate, the (H/I) elements outlined above are meant to be representative and to not reflect all possible (H/I) elements that may be employed.

In FIG. 1, RWZ communication system 104 and wireless device 110 control functions within communications system 100. Elements in RWZ communication system 104 and elements in wireless device 110 are merely representative, and communications system 100 can comprise many more of these elements within other RWZ communication systems 104 and wireless devices 110. Although only one wireless device 110 and wireless node 106 are shown in FIG. 1, the invention encompasses any number of these and is not limited by the particular configuration depicted in FIG. 1.

Software blocks that perform embodiments of the invention are part of computer program modules comprising computer instructions, such as control algorithms, that are stored in a computer-readable medium such as memory described above. Computer instructions can instruct processors to perform methods of operating wireless device 110 and RWZ communication system 104. In other embodiments, additional modules could be provided as needed.

The particular elements of the distributed communications system 100, including the elements of the data processing systems, are not limited to those shown and described, and they can take any form that will implement the functions of the invention herein described.

Figure 3:
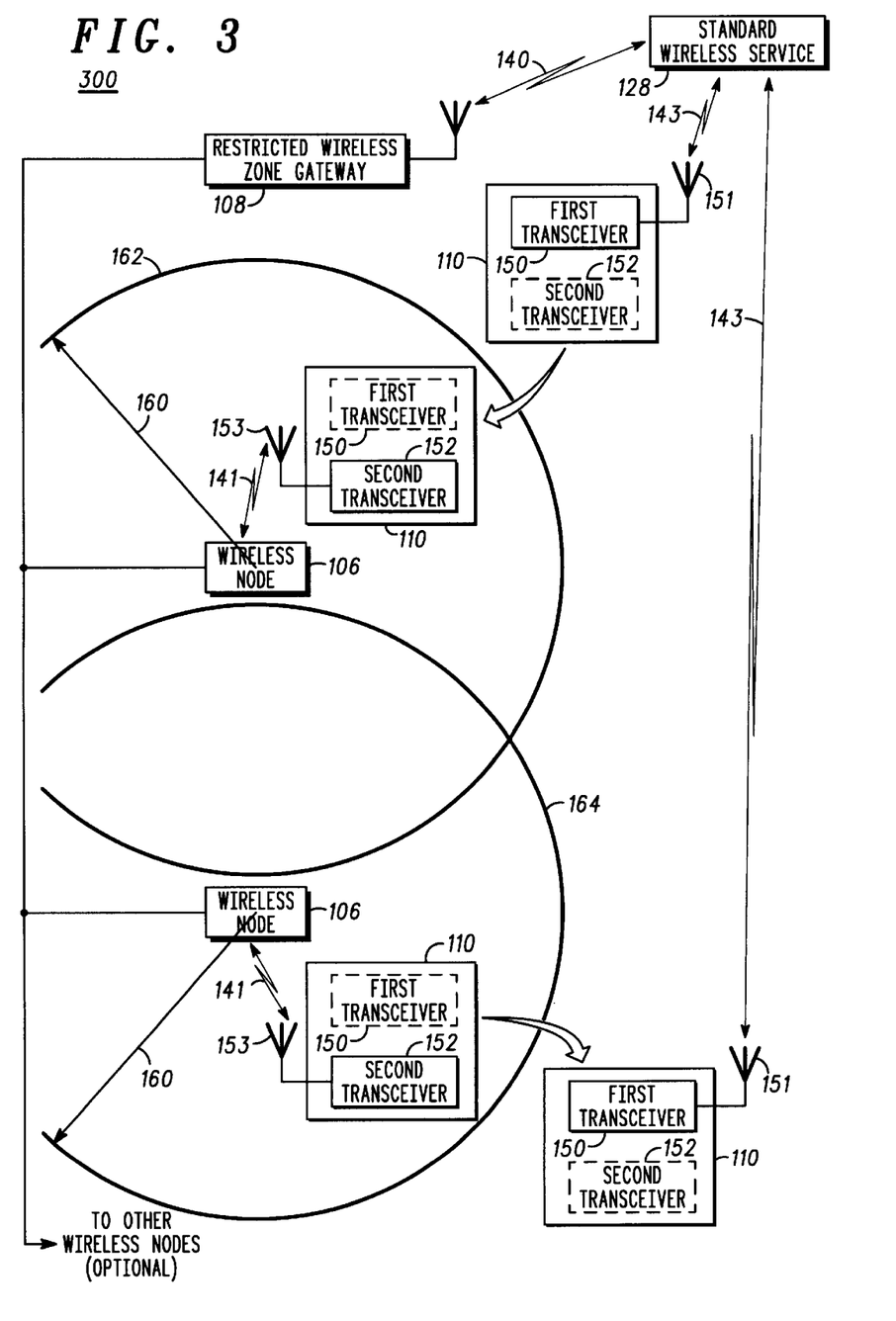
FIG. 3 illustrates a simplified block diagram of a wireless device entering and leaving a restricted wireless zone, according to one embodiment of the invention.

FIG. 3 illustrates a simplified block diagram 300 of a wireless device 110 entering and leaving a restricted wireless zone 102, according to one embodiment of the invention. As shown in FIG. 3, each wireless node 106 has a zone of influence 162, 164 around which wireless device will disable first transceiver 150 and enable second transceiver 152. Zone of influence 162, 164 extends a defined distance 160 from wireless node 106. Both zone of influence 162, 164 and defined distance 160 can be the same or different for each wireless node 106, depending on the size and extent of restricted wireless zone 102 and the number of wireless nodes 106 provided for a particular application. In an embodiment of the invention, zone of influence 162, 164 of one or more wireless nodes 106 define the boundaries of restricted wireless zone 102.

In another embodiment, zone of influence of one or more wireless nodes 106 do not define the boundaries of restricted wireless zone 102. For example, and without limitation, restricted wireless zone communication system 104 can be placed in a typical commercial aircraft where the use of wireless devices 110 is limited during portions of the flight and in many instances, wireless devices 110 will not function because the aircraft is out of range of a standard wireless service 128 pertaining to a particular wireless device 110. Wireless nodes 106 can be placed in strategic locations throughout the aircraft to some or all of the passenger areas. However, it may not be possible, or desirable, to place wireless nodes 106 to cover the entire passenger volume of the aircraft. Therefore, while the entire passenger volume of the aircraft is considered a restricted wireless zone 102, the zone of influence 162, 164 of one or more wireless nodes 106 may not cover the entire passenger volume. In this embodiment, wireless service though the use of second transceiver 152, and hence wireless service in general, may not be available to some users of wireless devices 110 in all locations of the passenger volume of the aircraft. Based on the above two embodiments, restricted wireless zone 102 and zone of influence 162, 164 will be used interchangeably hereinafter with an understanding that restricted wireless zone 102 and zone of influence 162, 164 can define the same or different areas or volumes of space.

As shown in the upper portion of FIG. 3, prior to entering a restricted wireless zone 102, or zone of influence 162, 164 as depicted here, wireless device 110 communicates in a primary mode utilizing first transceiver 150 and accompanying antenna 151 to communicate with standard wireless service 128 through wireless communication link 143 and thereby send and receive content. As described above, first transceiver 150 can be a standard cellular network protocols such as GSM, TDMA, CDMA, and the like, including TCP/IP protocol. Dashed lines around second transceiver 152 indicate that it is disabled outside of restricted wireless zone 102. Upon wireless device 110 entering zone of influence 162, 164, first transceiver 150 is disabled and second transceiver 152 is enabled. Dashed lines around first transceiver 150 indicate that it is disabled when inside zone of influence 162, 164.

While in zone of influence 162, 164, wireless device communicates in secondary mode utilizing second transceiver 152 and accompanying antenna 153 using wireless communication link 141. Communication with standard wireless service 128 occurs through RWZ gateway 108 and communication link 140 as described above. Other communication nodes and communication links can also be present as shown in FIG. 1, but are omitted here for clarity.

In an embodiment of the invention, when wireless device 110 enters restricted wireless zone 102, wireless device 110 can register with RWZ communication system 104, standard wireless service 128, and the like. In one example of an embodiment, user of wireless device can have a RWZ account set up with standard wireless service 128 in advance to support sending and receiving content on wireless device 110 in a restricted wireless zone 102. For example, wireless device 110 can utilize Bluetooth™ profiles such as Phone Access Profile, dial-up networking, Subscriber Identity Module (SIM) card access profile, and the like to access voice, video, data services, Internet services, email, and the like. In another example of an embodiment of the invention, user of wireless device 110 can utilize an Internet Service Provider (ISP) or wireless service provided by the administrator of restricted wireless zone 102 for use with RWZ gateway 108.

An advantage of an embodiment of the invention is the ability to receive content, including phone calls and data, while in a restricted wireless zone 102, such as an aircraft, utilizing wireless devices familiar to users, such as phones, computers, PDA's, and the like. Another advantage of the invention is the ability to seamlessly send and receive content from both within and outside of the restricted wireless zone 102 without the user having to manage the switch between transceivers or even know he or she is operating within a restricted wireless zone 102.

As shown in the lower portion of FIG. 3, when wireless device 110 leaves zone of influence 162, 164, first transceiver 150 is enabled and wireless device 110 communicates with standard wireless service 128 via wireless communication link 143. The dashed lines around second transceiver 152 indicate that it is disabled after exiting restricted wireless zone 102 and/or zone of influence 162, 164.

Figure 4:
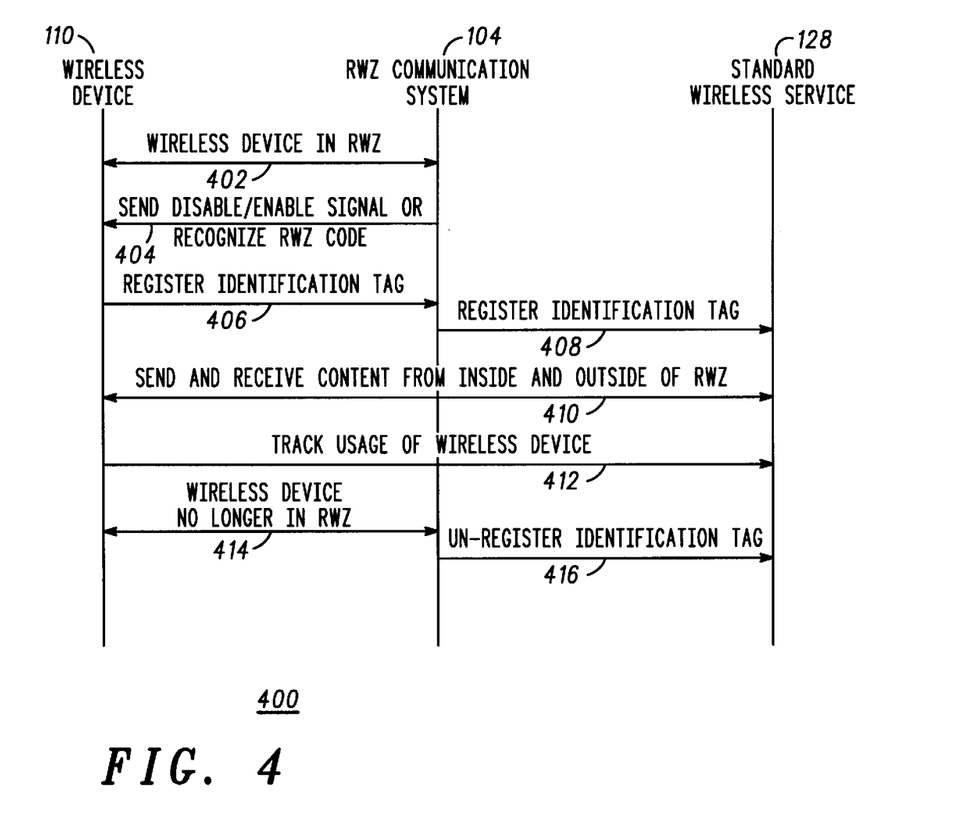
FIG. 4 illustrates a simplified ladder diagram, according to an embodiment of the invention.

FIG. 4 illustrates a simplified ladder diagram 400, according to an embodiment of the invention. In this example, a user brings a wireless device 110 into a restricted wireless zone 102 or into a zone of influence 162, 164 of wireless node 106. In one embodiment, wireless device receives a signal 402 from RWZ communication system 104 indicating that wireless device 110 has entered a restricted wireless zone 102. In another embodiment, wireless device 110 transmits a signal 402 to RWZ communication system 104 indicating that wireless device 110 has entered restricted wireless zone 102. In yet another embodiment, RWZ communication system 104 either periodically or continuously instructs wireless nodes 106 to search for wireless devices 110 and interact with them for service discovery.

RWZ communication system 104, via wireless node 106, sends a disable/enable signal 404 to wireless device 110 in order to disable first transceiver 150 and enable second transceiver 152. In another embodiment, wireless device 110 recognizes a restricted wireless zone code 404 and subsequently disables first transceiver 150 and enables second transceiver 152.

Once second transceiver 152 is enabled, wireless device 110 registers itself with RWZ communication system 104. Registration can be accomplished by wireless device 110 transmitting its unique identification tag 406 to RWZ communication system 104. Identification tag can be based on the SIM associated with wireless device 110, an Electronic Serial Number (ESN) associated with wireless device 110, a preprogrammed code provided by either standard wireless service 128 or RWZ communication system 104, a credit card number of a user of wireless device 110, and the like. Registration of wireless device 110 also includes any necessary subscription information necessary for proper billing for wireless device 110 usage while in restricted wireless zone 102.

For example, in a SIM card-based system, RWZ communication system 104 can utilize identification tag or subscription information residing on the SIM card via a Bluetooth™ SIM card Access Profile. If RWZ gateway 108 is, for example, a phonebank, wireless device 110 has assigned its identification tag to one of the phones in the phonebank of RWZ gateway 108. Thus content can be sent and received through the assigned phone in the phonebank as controlled through wireless device 110. In another embodiment, no particular phone in the phonebank of RWZ gateway 108 is assigned until communication is initiated either by wireless device 110 or a communication is set to be received by wireless device 110. In this embodiment, the identification tag of wireless device 110 is utilized only when content is sent or received, thereby allowing more efficient use of RWZ communication system 104 resources.

In another embodiment, such as a non-SIM card system, ESN transfers may not be allowed and wireless device 110 can send it's access number, for example its phone number if wireless device 110 is a cellular phone, to RWZ communication system 104. Subsequently, RWZ communication system 104 can verify wireless device 110 has proper access to RWZ communication system and establish a billing path to track usage of wireless device 110 usage in restricted wireless zone 102. This configuration allows wireless device 110 to send and receive content as described above.

After RWZ communication system 104 receives registration information, as described above, from wireless device 110, RWZ communication system 104 further sends a signal 408 to register identification tag from wireless device 110 with standard wireless service 128. This ensures that standard wireless service 128, which is utilized by wireless device 110 when in primary mode, is aware that wireless device 110 is functioning in a restricted wireless zone 102 and can be tracked and billed accordingly.

Subsequent to registration, wireless device 110 can send and receive content 410 from inside and outside of restricted wireless zone 102. Wireless device communicates with standard wireless service 128 in order to track usage 412 of wireless device 110 for billing purposes and incoming communications utilizing the registration procedure and identification tag described above.

When wireless device 110 exits restricted wireless zone 102, disable/enable signal is no longer received by wireless device and/or RWZ code is no longer recognized by wireless device 110 per signal 414. At this point, second transceiver 152 is disabled and primary transceiver is enabled, and RWZ communication system 104 un-registers 416 wireless device 110 with standard wireless service 128 so that standard wireless service is informed that wireless device 110 is no longer in restricted wireless zone 102 and can subsequently send and receive content in primary mode.

Figure 5:
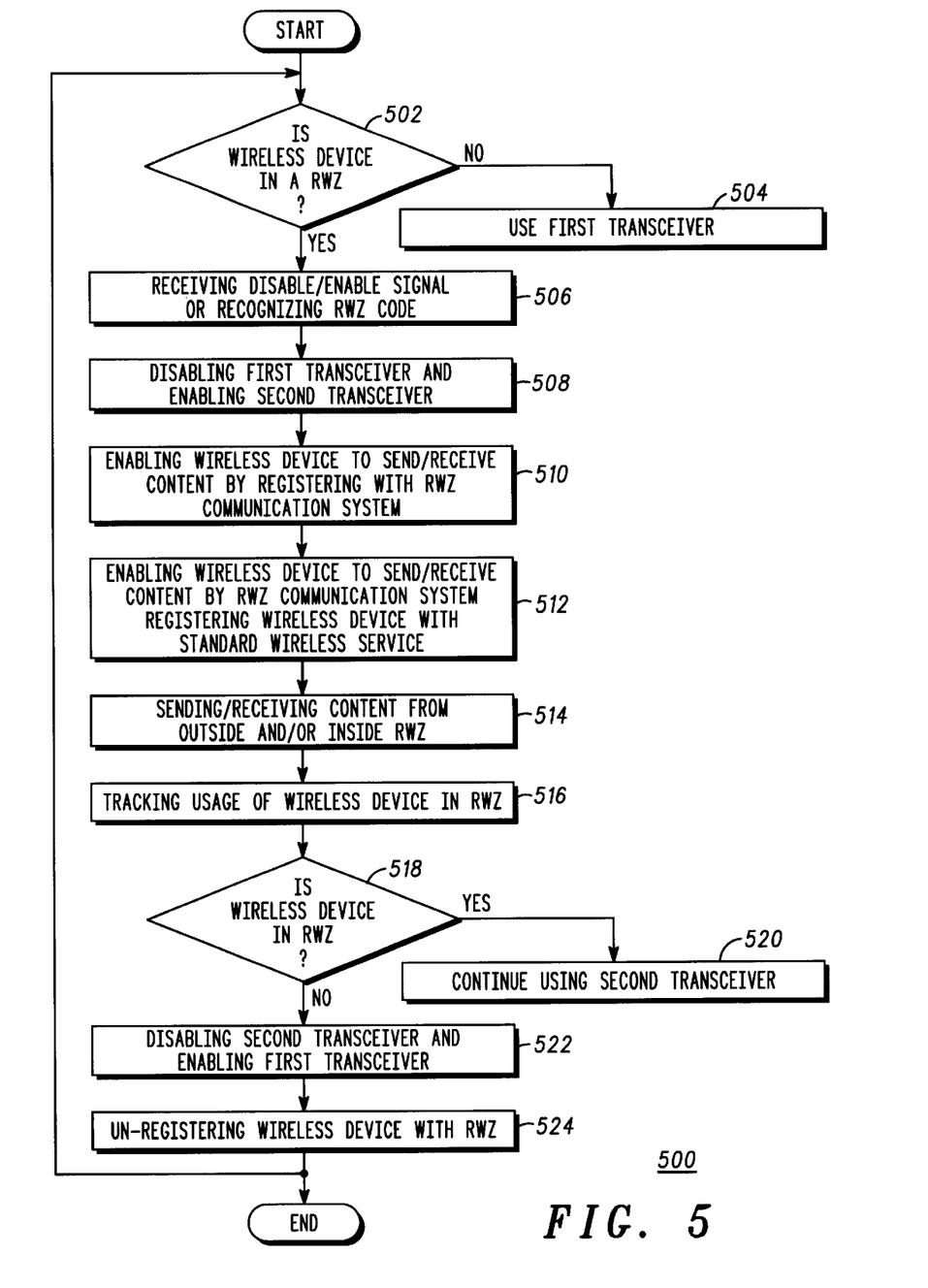
FIG. 5 illustrates a flow diagram of a method of wireless communication in a restricted wireless zone, according to one embodiment of the invention.

FIG. 5 illustrates a flow diagram 500 of a method of wireless communication in a restricted wireless zone 102, according to one embodiment of the invention. In step 502, it is determined if wireless device 110 is in a restricted wireless zone 102 or within a defined distance 160 of a wireless node 106. If wireless device 110 is not in a restricted wireless zone 102, first transceiver is used per step 504. If wireless device 110 is in a restricted wireless zone 102, disable/enable signal is received from RWZ communication system 104 per step 506. In another embodiment, step 506 can include wireless device 110 recognizing RWZ code embedded RWZ communication system 104 upon entering restricted wireless zone 102.

In step 508, first transceiver 150 is disabled and second transceiver is enabled when wireless device 110 enters restricted wireless zone 102 or within a defined distance 160 of wireless node 106. In step 510, wireless device 110 is enabled to send and receive content both inside and outside restricted wireless zone 102 by registering with RWZ communication system 104. In step 512, wireless device 110 is enabled to send and receive content inside and outside of restricted wireless zone 102 by RWZ communication system 104 registering wireless device 110 with standard wireless service 128. As described above, registering wireless device with both RWZ communication system 104 and standard wireless service 128 includes registering an identification tag of wireless device with RWZ communication system and standard wireless service 128.

In step 514, content is sent and received by wireless device 110 from outside and/or inside restricted wireless zone 102. In step 516, usage of wireless device 110 is tracked while in restricted wireless zone 102. This can include, for example and without limitation, tracking the time used, the services accessed and used, the applications accessed and used, whether services used were offered by standard wireless service 128, RWZ communication system 104, a third party, and the like.

In step 518, it is determined if wireless device 110 is in restricted wireless zone 102 or within a defined distance 160 of wireless node 106. If so, then wireless device 110 continues to use second transceiver per step 520. If wireless device 110 is no longer in restricted wireless zone 102 or outside of a defined distance 160 of wireless node 106, second transceiver 152 is disabled and first transceiver 150 is enabled per step 522, permitting wireless device 110 to return to primary mode and access standard wireless service 128 directly through first transceiver 150. In step 524, wireless device 110 un-registers from RWZ communication system 104 and un-registers from standard wireless service 128 in the context that wireless device is no longer in restricted wireless zone 102. The embodiment of the method presented in FIG. 5 can be repeated continuously or periodically as indicated by the return arrow to step 502.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A method of wireless communication within a restricted wireless zone comprising:

provide a restricted wireless zone communication system having one or more wireless nodes;

providing a wireless device having a first transceiver and a second transceiver, wherein the first transceiver is designed to communicate with a standard wireless service, wherein the first transceiver is restricted from operating within the restricted wireless zone, and wherein the second transceiver not restricted from operating within the restricted wireless zone;

upon the wireless device entering the restricted wireless zone, disabling the first transceiver and enabling the second transceiver to communicate with the restricted wireless zone communication system;

enabling the wireless device to send and receive content from outside the restricted wireless zone; and upon the wireless device leaving the restricted wireless zone, disabling the second transceiver and enabling the first transceiver.

2. The method of claim 1, wherein enabling the wireless device to send and receive comprises registering the wireless device with the restricted wireless zone communication system.

3. The method of claim 2, wherein enabling the wireless device to send and receive comprises the restricted wireless zone communication system further registering the wireless device with the standard wireless service.

4. The method of claim 1, wherein enabling the wireless device to send and receive comprises registering an identification tag associated with the wireless device with the standard wireless service via the restricted wireless zone communication system.

5. The method of claim 1, further comprising tracking usage of the wireless device while in the restricted wireless zone.

6. The method of claim 1, wherein disabling the first transceiver and enabling the second transceiver comprises disabling the first transceiver and enabling the second transceiver within a defined distance from the wireless node of the restricted wireless zone communication system.

7. The method of claim 1, wherein enabling the first transceiver and disabling the second transceiver comprises enabling the first transceiver and disabling the second transceiver outside of the defined distance from the wireless node of the restricted wireless zone communication system.

8. The method of claim 1, wherein disabling the first transceiver and enabling the second transceiver comprises receiving a disable/enable signal from the wireless node of the restricted wireless zone communication system, and wherein enabling the first transceiver and disabling the second transceiver comprises not receiving a disable/enable signal from the wireless node.

9. The method of claim 1, wherein disabling the first transceiver and enabling the second transceiver comprises the wireless device recognizing a restricted wireless zone code embedded in the restricted wireless zone communication system.

10. In a wireless device, a method of wireless communication within a restricted wireless zone utilizing a wireless zone communication system having one or more wireless nodes comprising:

providing with the wireless device a first transceiver and a second transceiver, wherein the first transceiver is designed to communicate with a standard wireless service, wherein the first transceiver is restricted from operating within the restricted wireless zone, and wherein the second transceiver not restricted from operating within the restricted wireless zone;

upon the wireless device entering the restricted wireless zone, disabling the first transceiver and enabling the second transceiver to communicate with the restricted wireless zone communication system;

enabling the wireless device to send and receive content from outside the restricted wireless zone; and upon the wireless device leaving the restricted wireless zone, disabling the second transceiver and enabling the first transceiver.

11. The method of claim 10, wherein enabling the wireless device to send and receive comprises registering an identification tag associated with the wireless device with the standard wireless service via the restricted wireless zone communication system.

12. The method of claim 10, further comprising tracking usage of the wireless device while in the restricted wireless zone.

13. The method of claim 10, wherein disabling the first transceiver and enabling the second transceiver comprises disabling the first transceiver and enabling the second transceiver within a defined distance from the wireless node of the restricted wireless zone communication system.

14. The method of claim 10, wherein enabling the first transceiver and disabling the second transceiver comprises enabling the first transceiver and disabling the second transceiver outside of the defined distance from the wireless node of the restricted wireless zone communication system.

15. The method of claim 10, wherein disabling the first transceiver and enabling the second transceiver comprises receiving a disable/enable signal from the wireless node of the restricted wireless zone communication system, and wherein enabling the first transceiver and disabling the second transceiver comprises not receiving a disable/enable signal from the wireless node.

16. The method of claim 10, wherein disabling the first transceiver and enabling the second transceiver comprises the wireless device recognizing a restricted wireless zone code embedded in the restricted wireless zone communication system.

17. A method of tracking wireless communication usage of a wireless device within a restricted wireless zone having a wireless zone communication system including one or more wireless nodes comprising:

providing with the wireless device a first transceiver and a second transceiver, wherein the first transceiver is designed to communicate with a standard wireless service, wherein the first transceiver is restricted from operating within the restricted wireless zone, and wherein the second transceiver not restricted from operating within the restricted wireless zone;

upon the wireless device entering the restricted wireless zone, disabling the first transceiver and enabling the second transceiver to communicate with the restricted wireless zone communication system;

enabling the wireless device to send and receive content from outside the restricted wireless zone; and upon the wireless device leaving the restricted wireless zone, disabling the second transceiver and enabling the first transceiver.

18. The method of claim 17, wherein enabling the wireless device to send and receive comprises registering the wireless device with the restricted wireless zone communication system.

19. The method of claim 18, wherein enabling the wireless device to send and receive comprises the restricted wireless zone communication system further registering the wireless device with the standard wireless service.

20. The method of claim 17, wherein enabling the wireless device to send and receive comprises registering an identification tag associated with the wireless device with the standard wireless service via the restricted wireless zone communication system.

21. A computer-readable medium containing computer instructions for instructing a processor to perform a method of wireless communication within a restricted wireless zone utilizing a wireless zone communication system having one or more wireless nodes, the instructions comprising:

providing a wireless device having a first transceiver and a second transceiver, wherein the first transceiver is designed to communicate with a standard wireless service, wherein the first transceiver is restricted from operating within the restricted wireless zone, and wherein the second transceiver not restricted from operating within the restricted wireless zone;

upon the wireless device entering the restricted wireless zone, disabling the first transceiver and enabling the second transceiver to communicate with the restricted wireless zone communication system;

enabling the wireless device to send and receive content from outside the restricted wireless zone; and upon the wireless device leaving the restricted wireless zone, disabling the second transceiver and enabling the first transceiver.

22. The computer-readable medium in claim 21, wherein enabling the wireless device to send and receive comprises registering an identification tag associated with the wireless device with the standard wireless service via the restricted wireless zone communication system.

23. The computer-readable medium in claim 21, further comprising tracking usage of the wireless device while in the restricted wireless zone.

24. The computer-readable medium in claim 21, wherein disabling the first transceiver and enabling the second transceiver comprises disabling the first transceiver and enabling the second transceiver within a defined distance from the wireless node of the restricted wireless zone communication system.

25. The computer-readable medium in claim 21, wherein enabling the first transceiver and disabling the second transceiver comprises enabling the first transceiver and disabling the second transceiver outside of the defined distance from the wireless node of the restricted wireless zone communication system.

26. The computer-readable medium in claim 21, wherein disabling the first transceiver and enabling the second transceiver comprises receiving a disable/enable signal from the wireless node of the restricted wireless zone communication system, and wherein enabling the first transceiver and disabling the second transceiver comprises not receiving a disable/enable signal from the wireless node.

27. The computer-readable medium in claim 21, wherein disabling the first transceiver and enabling the second transceiver comprises the wireless device recognizing a restricted wireless zone code embedded in the restricted wireless zone communication system.

* * * * *